(No Model.)
A. KWOCZALLA.
FAT CUTTING MACHINE.
No. 269,298. Patented Dec. 19, 1882.
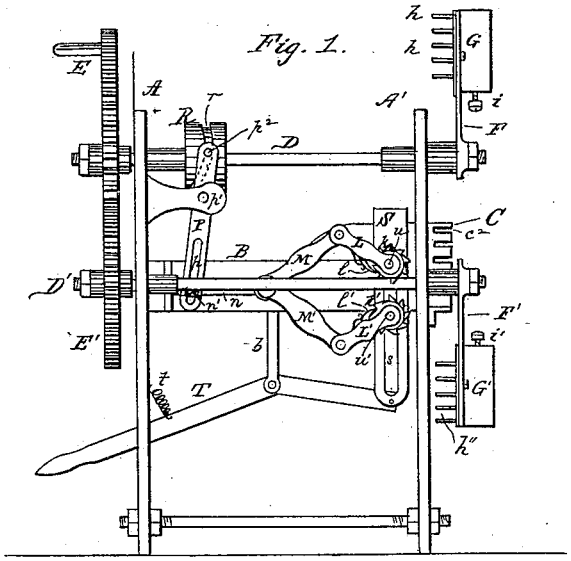
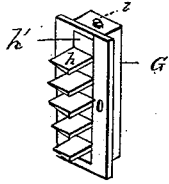
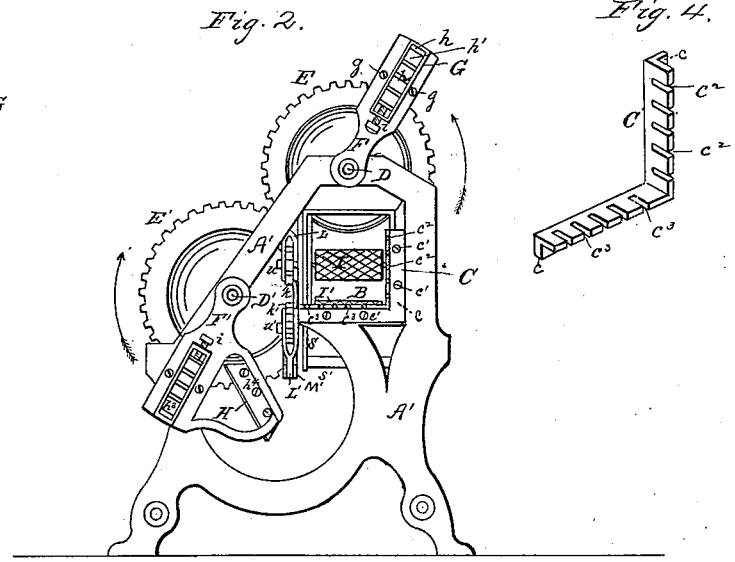
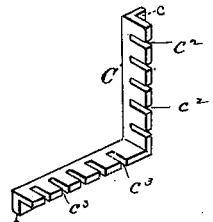
Witnesses:—
John M. Patterson,
G. Smith.
Inventor:
Alois Kwoczalla,
by Connolly Bros & McTighe
Attorneys.

UNITED STATES PATENT OFFICE.

ALOIS KWOCZALLA, OF PITTSBURG, PENNSYLVANIA.

FAT-CUTTING MACHINE.

SPECIFICATION forming part of Letters Patent No. 269,298, dated December 19, 1882.

Application filed September 14, 1882. (No model.)

*To all whom it may concern:*

Be it known that I, ALOIS KWOCZALLA, of Pittsburg, in the county of Allegheny and State of Pennsylvania, have invented certain new and useful Improvements in Fat-Cutting Machines; and I do hereby declare that the following is a full, clear, and exact description of the invention, which will enable others skilled in the art to which it appertains to make and use the same, reference being had to the accompanying drawings, which form a part of this specification, in which—

Figure 1 is a front elevation of the machine. Fig. 2 is an end view. Fig. 3 is a perspective view of one of the frames or cases containing a set of knives. Fig. 4 is a similar view of the slitted L-shaped plate which occupies the delivery end of the fat-trough.

My invention relates to a machine for cutting fat; and it consists in the provision of two rotary cutters consisting each of a series of parallel knives secured to arms on parallel shafts, and arranged in such manner that the planes of motion of one series of knives will intersect the planes of motion of the other series at the point where the cutting operation takes place.

It further consists in the provision of a feed-trough having suitable feeding mechanism, and provided with an L-shaped slitted resistance-plate at one end, through which the knives pass after slitting or cutting the fat.

It still further consists in certain details of construction hereinafter described and claimed.

Referring to the accompanying drawings, A A' represent the upright sides of the frame of the machine.

B is a rectangular trough secured to the sides A A' and open at top.

C is an L-shaped plate secured to the side of the frame A' at the end of the trough by screws $c'$ $c'$, running through a flange, $c$, on the plate. The plate C forms a prolongation of the bottom and one side of the trough. The plate C has slots $c^2$ $c^2$ $c^3$ $c^3$ cut in both its perpendicular and horizontal flanges, extending in toward the frame A'.

D D' are shafts journaled in the frame A A', and having at one end gear-wheels E E', which mesh with one another and are of equal size. The wheel E has a handle, by which it is turned; or the shaft D may have a pulley attached, to which motion may be communicated from a power-shaft. To the opposite end of shaft D, and outside of the frame side A', is secured an arm, F, having an open-ended slot, in which is placed a rectangular frame, G, secured to the arm F by screws $g$ $g$, which pass through a flange on the frame G. In the frame G is placed a number of knives, $h$ $h$, separated from one another by blocks $h'$ $h'$, the knives and blocks being all held securely in position by a set-screw, $i$, at the bottom of frame G. The knives $h$ $h$ have their cutting-edges turned in the direction of the revolution of the arm F, and are equal in number to the slots in the vertical side of the plate C, and are of such size that they will pass through said slots when the arm F is swung around. The arm F', secured to the end of shaft D', has a similar frame and set of knives, $h''$, blocks $h^3$, &c., to the frame F, and has, in addition, a shearing-knife, H, attached to an extension of one side of the arm F' by screws $h^4$ $h^4$ $h^4$. The knife H is laid flat on the inside of the extension of the arm F', and has its cutting-edge turned toward the rectangular frame and its contained knives, and the edge of the shearing-knife is set so as to give a shearing cut to the fat in the trough B.

Referring now to the mechanism for feeding the fat to the cutting-knives, I I' are two rollers journaled at the end of the trough B, just back of the plate C, and having projecting shafts $u$ $w'$, upon which are secured ratchet-wheels $k$ $k'$ between the bifurcated ends of levers L L', pivoted on shafts $u$ $w'$, and provided with spring-dogs $l$ $l'$, which engage with the ratchet-wheels $k$ $k'$ and cause them and the rolls I I' to revolve when the levers are depressed or brought together. To the opposite end of each of the levers L L' are pivoted rods M M', which are both attached at their other ends to a rod, $n$, which has a screw, $n'$, passing through a slot, $p$, in a lever, P, pivoted at $p'$ to the frame A. A pin, $p^2$, at the upper end of lever P, works in a slot, $r$, in a cam, R, on the shaft D. The upper roll, I, is journaled in a frame, S, on the outside of the trough B, its shafts $u$ passing through vertical slots in the trough B. The roll I' is journaled in the sides of the trough B, and its shaft passes out through slots $s$ in the frame S. At the lower end of the frame S, and to a cross-bar, $s'$, thereon, is attached a lever, T, pivoted to a hanger, $b$, on the trough B, and having a spring, t, at its outer end, which tends to draw up said lever, depress the frame S, and bring the rolls I I′ into contact. The rolls I I′ have roughened or corrugated surfaces, which enable them to firmly grasp the fat and feed it toward the cutting-knives.

The operation of my invention is as follows: A slab of fat is placed in the trough B, with its end projecting out between the rolls I I′. The upper roll is held firmly down upon the fat by the tension of the spring t acting upon the lever T and movable frame S. The wheel E is then turned to the right, the arm F descends, and the knives in said arm cut a series of nearly-horizontal slits in the slab of fat. The arm F′ follows after and cuts a series of slits in the slab on a plane at right angles to those cut by the knives in arm F. The still further movement of the arm F′ brings down the knife H, which cuts off the end of the slab, the result of the several cuts being that the fat is delivered in the form of a number of cubes or blocks. The cutting of the slab is facilitated by the plate C, against which the fat is pressed by the knives, and which serves to clear the knives after they have passed through the fat. After the fat has been cut, as described, the feed-rolls are moved partially around by the action of the cam-wheel R and connecting-levers P M L and ratchets k k′. This feeds forward the fat to the knives, where it is cut, as before. The knives on the revolving arms being set in a removable case or frame, and the knives being removable from the frame, they may be removed for grinding; or the frame may be replaced by one having a greater or less number of knives, in which case the plate C is removed and one substituted with a number of slots corresponding to the number of knives in the frame. The forward feeding of the fat may be regulated by moving the end of the rod n up or down in the slot p in lever P, and thus shortening or lengthening the stroke of rods M M′ and levers L L′.

I claim as my invention—

1. In a fat-cutting machine, the combination of two rotary cutters, consisting each of a series of parallel knives on arms rotating on parallel shafts, a rotary cutting-off knife on one of said shafts, and a slitted resistance plate or plates, substantially as described.

2. In a fat-cutting machine, the combination, with the two series of rotating knives h and h″, arranged to cut the fat in planes at right angles to one another, and the cutting-off knife H, of a trough, B, and two feed-rolls, I I′, adapted to intermittent rotation, substantially as described.

3. In a fat-cutting machine, the combination of two rotary cutters, consisting each of a series of parallel knives on arms rotating on parallel shafts, and so arranged that the planes of motion of one series of knives will intersect the planes of motion of the other series, substantially as described.

4. The combination, with trough B, having the slitted plate C, of the rotating shaft D, having arm F and its knives h, and rotating shaft D′, having arm F′, carrying the slitting-knives h″ and cutting-off knife H, substantially as set forth.

In testimony that I claim the foregoing as my own I have hereto affixed my signature in presence of two witnesses.

ALOIS KWOCZALLA.

Witnesses:
T. J. PATTERSON,
T. J. McTIGHE.